Figures 1, 2:
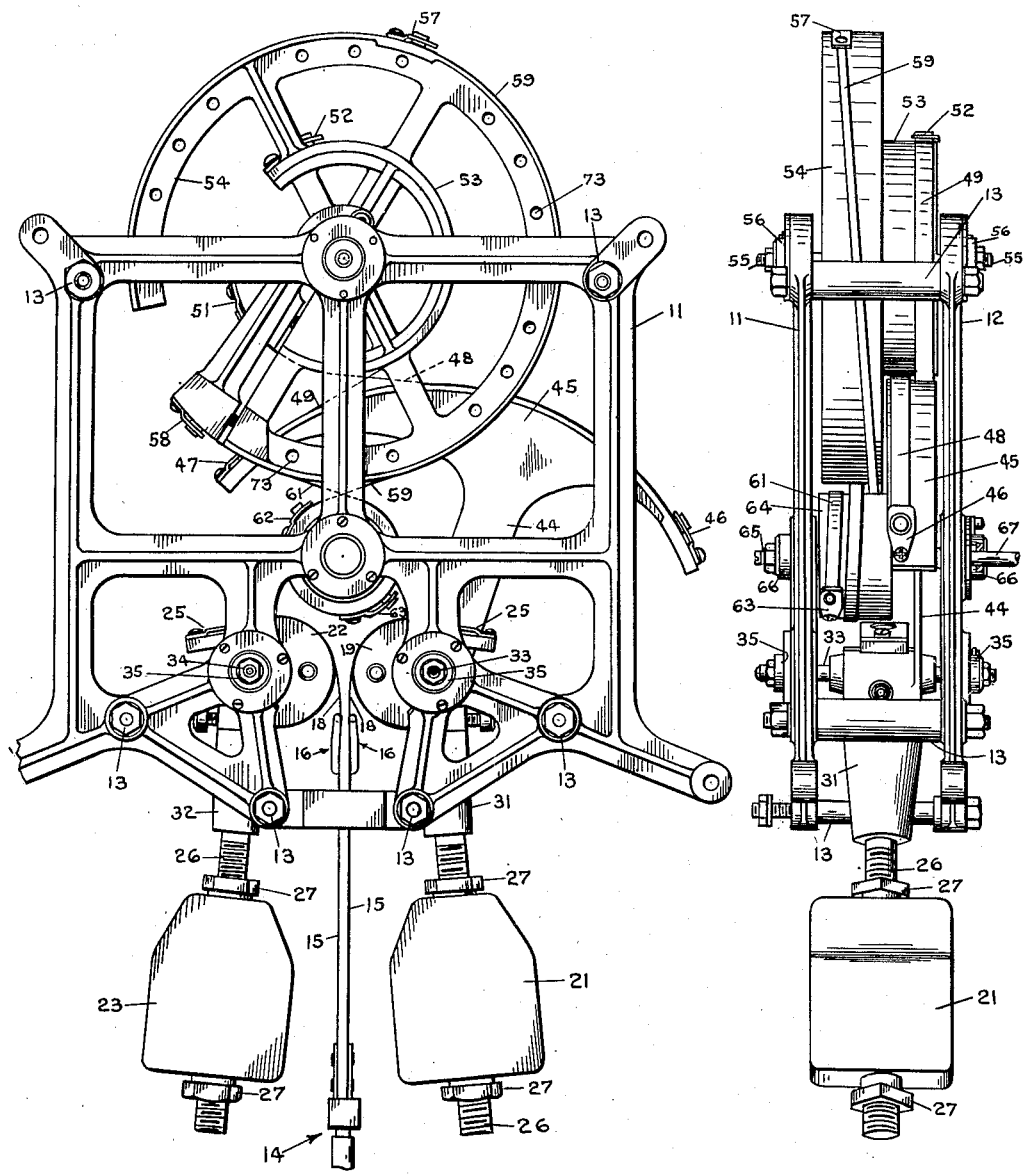

Oct. 7, 1952     L. D. SINGLETON     2,613,073
WEIGHING SCALE

Filed Feb. 11, 1946     3 Sheets-Sheet 1

INVENTOR.
LESTER D. SINGLETON.
BY
Henry Sherman
Attorney

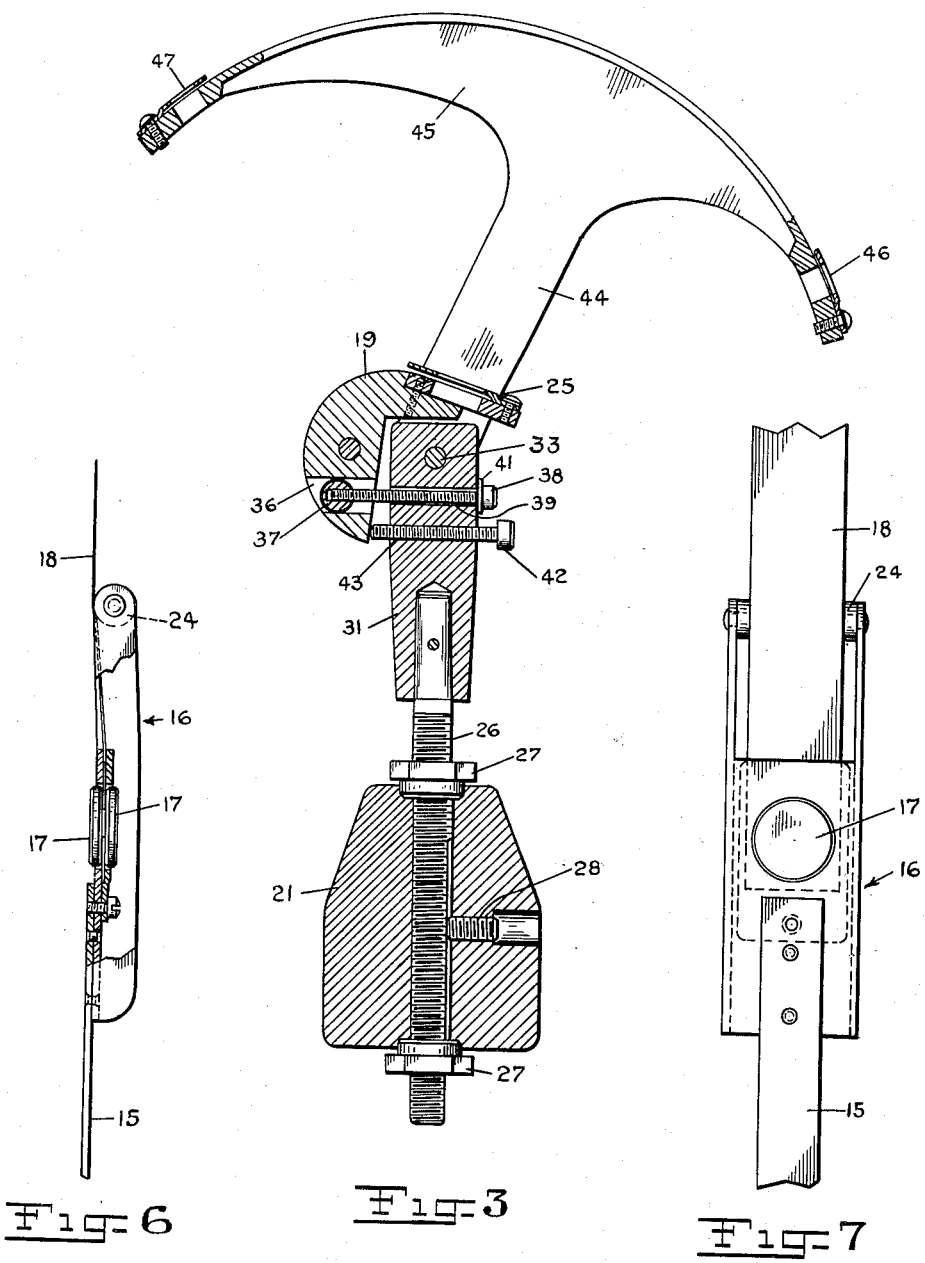

Oct. 7, 1952     L. D. SINGLETON     2,613,073
WEIGHING SCALE
Filed Feb. 11, 1946     3 Sheets-Sheet 3
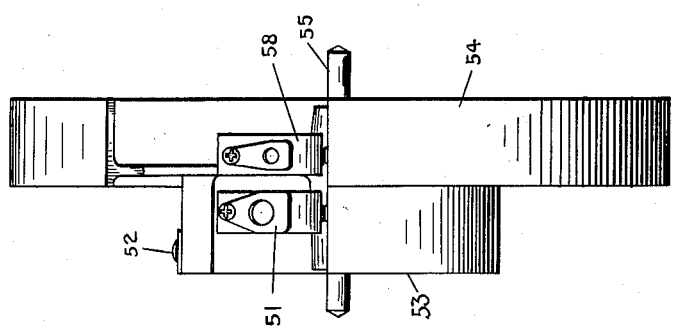
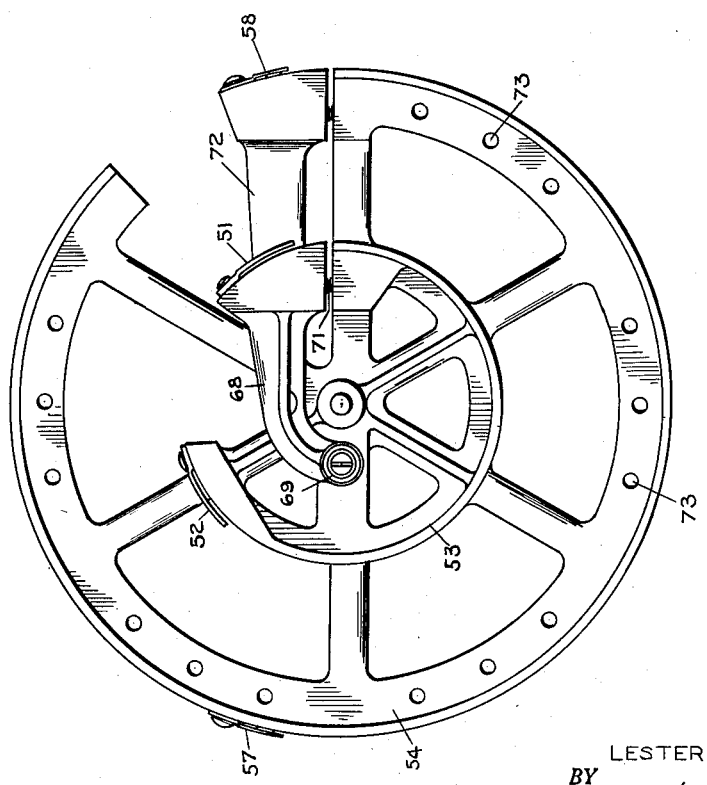
INVENTOR.
LESTER D. SINGLETON.
BY Patented Oct. 7, 1952

2,613,073

UNITED STATES PATENT OFFICE 2,613,073

WEIGHING SCALE

Lester D. Singleton, Rutland, Vt., assignor to The Howe Scale Company, a corporation of Vermont Application February 11, 1946, Serial No. 646,883

15 Claims. (Cl. 265—62)

This invention relates to weighing scales, and relates more particularly to weighing scales of the pendulum type.

It is an object of this invention to provide in a weighing scale of this type an improved construction, combination, and arrangement of parts employing an all-tape drive for rotating the pointer shaft through varying degrees of rotation from 0° to more than 360°.

Another object of this invention is the provision in a weighing scale of this type of an all-tape drive for positively rotating the pointer shaft in both directions without lag or lost motion in either direction.

A further object of this invention is to provide an improved arrangement of the tapes for driving the pointer shaft drum so that the drive tape and the take-up tape both follow the same path, thus reducing the size of the drum required and also compensating for possible indicator variations caused by foreign matter collecting on the tape tracks.

Still another object of this invention is to provide novel pendulum cam structures designed to give uniform translation over their entire range in all positions, and having novel adjusting mechanism.

Yet another object of this invention is to provide novel translating and multiplying components which may be actuated over their entire travel range by either one or two pendulums.

Other objects and advantages of this invention will appear from the following detailed description and the appended claims.

In the drawings wherein a preferred embodiment of this invention is shown,

Fig. 1 is a rear elevational view of the dial head mechanism of this invention removed from the casing which normally encases the same, which casing is adapted to rest on a suitable column or other support, Fig. 2 is a side elevational view of the dial head mechanism shown in Fig. 1, Fig. 3 is a detail view, on an enlarged scale and partly in section, of the pendulum, pendulum cam, and multiplying sector, showing details of the pendulum cam adjusting mechanism, Fig. 4 is a detail view, on an enlarged scale, of the multiplying tape sector, Fig. 5 is a side elevational view of the multiplying tape sector, Fig. 6 is a detail view, on an enlarged scale and partly in section, of the tape connector, and Fig. 7 is a front elevational view of the tape connector shown in Fig. 6.

Like characters of reference indicate like parts throughout the several views of the drawings.

Referring first to Figs. 1 and 2 of the drawings, the refernce numeral 11 indicates the rear framework and reference numeral 12 the front framework, separated by bolt and spacer sleeve combinations 13, on which frameworks the dial head elements are mounted.

Connected to the tare mechanism or to the steelyard rod (not shown) by any suitable means, such as a swivel arrangement generally indicated by reference numeral 14, are metal straps 15 which are in turn fixed to connectors generally indicated by reference numeral 16 (see Figs. 6 and 7). Pivotally attached to each of said connectors, as by means of buttons 17, are flexible metallic tapes 18, one of which is connected to the cam 19 of load pendulum 21 and the other to the cam 22 of compensating pendulum 23. The pendulum cams are so designed as to give uniform translation over their entire range at all positions. As they pass upward, the tapes 18 contact spacer 24 rotatably mounted in connector 16. The tapes 18 are pivotally mounted on cams 19 and 22 by novel clips or tape anchors 25 described and claimed in my co-pending application, S. No. 626,236, filed November 2, 1945. The length of the tapes between the anchor points on the connectors 16 and cams 19 and 22 is preferably on the order of five inches. It has been found that the use of the connectors and of the five-inch length of tape prevents buckling and kinking of the tapes, and overcomes the danger of contact between the tapes during all movement of the cams.

The pendulums 21 and 23 are adjustable upon screw-threaded rods 26 and held in adjusted position by means of locknuts 27 and set-screw 28, as is well understood in the art. The pendulum rods 26 are attached to, as by means of a pin, hubs 31 and 32 which are fixed to shafts 33 and 34, respectively, journaled in suitable anti-friction bearings 35 mounted in frameworks 11 and 12.

As is shown in Fig. 3, means are provided to adjust the cams angularly, it being understood both the load pendulum cam 19 and the compensating pendulum cam 22 have a similar adjusting arrangement. Thus, the cam 19 is provided with an opening 36 in which is fixed a screw-threaded plug 37 adapted to receive a cap screw 38 passing through an opening 39, of slightly larger diameter than the diameter of said cap screw 38, in the pendulum hub 31, a washer 41 being provided between the cap of the screw 38 and the opening 39. A cap-screw 42 passing through screw-threaded opening 43 is provided to lock the cam 19 in adjusted position. The adjustment of cams 19 and 22 will enable setting of the zero on the scale.

The foregoing adjustment of the pendulum cams is such that when both cams are adjusted equal amounts, maximum change is obtained at full load with no change at no load, the change rate following a uniform curve. Moreover, the design of the pendulums is such that throughout their adjustment range, the center of gravity thereof is moved in a straight line which coincides with the radium line of their operating movement. This design eliminates the necessity of cam adjustments in conjunction with pendulum adjustments.

Integral with the hub 31 of the load pendulum is a hub 44 of a tape sector 45 adapted to multiply the movement of load pendulum cam 19. Tape sector 45 has attached thereto as by tape anchors 46 and 47, one end of each of flexible metallic tapes 48 and 49, respectively, the opposite ends of which are attached by tape anchors 51 and 52, respectively, to a translating or input drum sector 53 and integral with multiplying or output drum sector 54. Both drum sector 53 and drum sector 54 are mounted on shaft 55 journaled in suitable anti-friction bearings 56 carried in frameworks 11 and 12. The multiplying drum sector 54 has attached thereto, as by tape anchors 57 and 58, one end of each of flexible metallic tapes 59 and 61, respectively, the other ends of which are attached by tape anchors 62 and 63, respectively, to a pointer drum 64. The pointer drum is mounted on a shaft 65 journaled in suitable anti-friction bearings 66. An extension 67 of shaft 65 is provided for mounting thereon the pointer which co-operates with the scale chart.

It will be noted from the above that there is an all-tape drive of the sectors and the pointer drum in both directions, thus giving positive movement to the pointer shaft and thereby to the pointer without lag or lost motion in either direction. Moreover, tapes 59 and 61 are so arranged on the pointer drum 64 that both follow the same path, i. e. as tape 61 unrolls from drum 64, tape 59 rolls on to the drum in the same position formerly occupied by convolutions of tape 61. This arrangement compensates for possible indicator variations caused by foreign matter collecting on tape tracks on the pointer drum.

The drum sector 53 is provided with a spring compression or tape take-up arm 68 pivoted at 69 on said drum sector. A compression spring 71 is suitably arranged between the take-up arm and the drum sector proper. A similarly constructed arm 72 is carried by drum sector 54. The spring loading of one tape of each pair operating on each drum sector compensates for the expansion and contraction of the metallic tapes caused by atmospheric conditions, thereby eliminating any danger of change in pointer movement due to said atmospheric conditions.

The drum sector 54 is provided with a series of circumferentially arranged holes 73 adapted to receive plugs of lead or other suitable metal for balancing said drum sector.

From the foregoing description, it will be appreciated that the translating and multiplying components are so constructed and arranged that they can be actuated over their entire travel range by either one or two pendulums. This permits full multiplication on small capacity weighing scales where level operating conditions can be maintained.

The embodiment of my invention shown and described herein is to be considered merely as illustrative as the invention is susceptible to variation, modification and change within the spirit and scope of the appended claims.

What I claim as new and desire to secure by Letters Patent is:

1. In a weighing scale of the class described, the combination with load counterbalancing means, of a pointer drum and means for transmitting movement of said load counterbalancing means to said pointer drum, said latter means including translating and multiplying elements and flexible tapes, said elements including a relatively small diameter translating input drum sector, a relatively larger diameter multiplying output drum sector moving with said input drum sector, said pointer drum being driven from said output drum sector and said input drum sector being driven from said load counterbalancing means by said flexible tapes, said drum sectors having spring-compression tape-take-up arms upon which the ends of the tapes on said sectors are mounted and which compensate for expansion and contraction of the tapes.

2. In a weighing scale of the class described, the combination with load counterbalancing means, of a pointer drum and means for transmitting movement of said load counterbalancing means to said pointer drum, said latter means including a tape sector, a translating drum sector, a multiplying drum sector and, two oppositely extending tapes connecting said tape sector with said translating drum sector and two oppositely extending tapes connecting said multiplying drum sector with said pointer drum, whereby one of said tapes of each pair will wrap up on its respective attachment as rapidly as the other tape unwraps from its attachment.

3. In a weighing scale of the class described, the combination with load counterbalancing means, of a pointer drum and means for transmitting movement of said load counterbalancing means to said pointer drum, said latter means including a tape sector, a translating drum sector, a multiplying drum sector integral with said translating drum sector and, two oppositely extending tapes connecting said tape sector with said translating drum sector and two oppositely extending tapes connecting said multiplying drum sector with said pointer drum, whereby one of said tapes of each pair will wrap up on its respective attachment as rapidly as the other tape unwraps from its attachment.

4. In a weighing scale of the class described, the combination with load counterbalancing means, of a pointer drum and means for transmitting movement of said load counterbalancing means to said pointer drum, said latter means including a tape sector operatively connected to said load counterbalancing means, a translating drum sector, a multiplying drum sector connected to said translating drum sector, two oppositely extending and crossing closely adjacent but offset flexible tapes connecting said tape sector with said translating drum sector and two oppositely extending and crossing closely adjacent but offset flexible tapes connecting said multiplying drum sector with said pointer drum for positively moving said pointer drum in both directions.

5. In a weighing scale of the class described, the combination with load counterbalancing means, of a pointer drum and means for transmitting movement of said load counterbalancing means to said pointer drum, said latter means including a tape sector operatively connected to said load counterbalancing means, a translating drum sector, a multiplying drum sector integral with said translating drum sector, two oppositely extending and crossing closely adjacent but offset flexible tapes connecting said tape sector with said translating drum sector and two oppositely extending and crossing closely adjacent but offset flexible tapes connecting said multiplying drum sector with said pointer drum for positively moving said pointer drum in both directions, said drum sectors having spring-compression tape-take-up arms upon which the ends of the tapes on said sectors are mounted and which compensate for expansion and contraction of the tapes.

6. In a weighing scale of the class described, the combination with a load counterbalancing pendulum, of a pointer drum and means for transmitting movement of said pendulum to said pointer drum, said means including a tape sector movable with said load pendulum, a translating drum sector, a multiplying drum sector integral with said translating drum sector, two opposite extending and crossing closely adjacent but offset flexible tapes connecting said tape sector with said translating drum sector and two oppositely extending and crossing closely adjacent but offset flexible tapes connecting said multiplying drum sector with said pointer drum for positively moving said pointer drum in both directions.

7. In a weighing scale of the class described, the combination with a load counterbalancing pendulum, a compensating pendulum, an adjustable cam on each of said pendulums and means including flexible tapes attached to said cams for transmitting the load to said pendulums, of a pointer drum and means for transmitting movement of said load pendulum to said pointer drum, said latter means including a tape sector movable with said load pendulum, a translating drum sector, a multiplying drum sector integral with said translating drum sector, two oppositely extending and crossing closely adjacent but offset flexible tapes connecting said tape sector with said translating drum sector and two oppositely extending and crossing closely adjacent but offset flexible tapes connecting said multiplying drum sector with said pointer drum for positively moving said pointer drum in both directions.

8. In a weighing scale of the class described, the combination with a load counterbalancing pendulum, a compensating pendulum, a cam on each of said pendulums and means including flexible tapes attached to said cams for transmitting the load to said pendulums, of a pointer drum and means for transmitting movement of said load pendulum to said pointer drum, said latter means including a tape sector movable with said load pendulum, a translating drum sector, a multiplying drum sector integral with said translating drum sector, two oppositely extending and crossing closely adjacent but offset flexible tapes connecting said tape sector with said translating drum sector and two oppositely extending and crossing closely adjacent but offset flexible tapes connecting said multiplying drum sector with said pointer drum for positively moving said pointer drum in both directions, said drum sectors having spring-compression tape-take-up arms upon which the ends of the tapes on said sectors are mounted and which compensate for expansion and contraction of the tapes.

9. In a weighing scale of the class described, the combination with a load counterbalancing pendulum, a compensating pendulum, an adjustable cam on each of said pendulums and means, including metal straps, connectors fixed to said straps and flexible tapes pivotally attached to said connectors and said cams, for transmitting the load to said load pendulum, a tape sector movable with said load pendulum, a translating drum sector, a multiplying drum sector integral with said translating drum sector, two oppositely extending and crossing closely adjacent but offset flexible tapes connecting said tape sector with said translating drum sector and two oppositely extending and crossing closely adjacent but offset flexible tapes connecting said multiplying drum sector with said pointer drum for positively moving said pointer drum in both directions.

10. In a weighing scale of the class described, the combination with load counterbalancing means, of a pointer drum and means for transmitting movement of said load counterbalancing means to said pointer drum, said latter means including a tape sector, a translating drum sector and a multiplying drum sector integral with said translating drum sector, two oppositely extending and crossing closely adjacent but offset flexible tapes attached at separate points on said tape sector and at separate points on said translating drum sector for positively moving said translating drum sector in either direction, and two oppositely extending and crossing closely adjacent but offset flexible tapes attached at separate points on said multiplying drum sector and at two separate points on said pointer drum for positively moving said pointer drum in either direction.

11. In a weighing scale of the class described, the combination with load counterbalancing means, of a pointer drum and means for transmitting movement of said load counterbalancing means to said pointer drum, said latter means including a tape sector, a translating drum sector and a multiplying drum sector integral with said translating drum sector, two oppositely extending and crossing closely adjacent but offset flexible tapes attached at separate points on said tape sector and at separate points on said translating drum sector for positively moving said translating drum sector in either direction, and two oppositely extending and crossing closely adjacent but offset flexible tapes attached at separate points on said multiplying drum sector and at two separate points on said pointer drum for positively moving said pointer drum in either direction, said flexible tapes assuming the same path in winding about said pointer drum during rotation thereof, said drum sectors having spring-compression tape-take-up arms upon which the ends of the tapes on said sectors are mounted and which compensate for expansion and contraction of the tapes.

12. In a weighing scale of the class described, the combination with a load counterbalancing pendulum and a cam carried thereon, of means for transmitting the load to said pendulum, said means comprising a connector having a flat portion and a rotatable deflector, a metal strap fixed to said flat portion of said connector at one end and at the other end to the load and a relatively short flexible tape pivotally mounted at one end on said flat portion of said connector and at its other end on said cam and contacting said deflector at a point intermediate said pivotal points.

13. In a weighing scale of the class described, the combination with a load counterbalancing pendulum and a cam carried thereon, of means for transmitting the load to said pendulum, said means comprising a connector having a flat portion and a rotatable deflector, a metal strap fixed to said flat portion of said connector at one end and at the other end to the load and a relatively short flexible tape pivotally mounted at one end on said flat portion of said connector and at its other end on said cam and contacting said deflector at a point intermediate said pivotal points, said metal strap and the portion of said flexible tape between said spacer and said cam being in the same vertical plane.

14. In a weighing scale of the class described, a pendulum comprising a hub, a screw thread rod attached to said hub and a weight adjustable on said rod, a cam carried by said hub in spaced relation thereto, and means for adjusting said cam relative to said hub, said means including two parallel screw adjustments extending through said hub and engaging said cam, said cam having a recess and said hub pivotally mounted within and substantially filling said recess and upon adjustment swinging away or toward said cam, one of said screw elements extending only through said hub and abutting the cam and the other extending through both said cam and hub.

15. In a weighing scale of the class described, a pendulum comprising a hub, a screw thread rod attached to said hub and a weight adjustable on said rod, a cam carried by said hub in spaced relation thereto, and means for adjusting said cam relative to said hub, said means comprising a screw-threaded plug carried in an opening in said cam and extending parallel to the axis of said cam, a screw mounted in an opening in said hub for cooperating with said plug to move said cam angularly with respect to said hub, and a screw mounted in a screw-threaded opening in said hub for holding said cam in adjusted position, said cam having a recess and said hub pivotally mounted within and substantially filling said recess and upon adjustment swinging away or toward said cam, one of said screw elements extending only through said hub and abutting the cam and the other extending through both said cam and hub.

LESTER D. SINGLETON.

REFERENCES CITED

The following references are of record in the file of this patent:

UNITED STATES PATENTS

| Number | Name | Date |
|---|---|---|
| 910,056 | Good | Jan. 19, 1909 |
| 1,522,609 | Bergen | Jan. 13, 1925 |
| 1,550,125 | Timson | Aug. 18, 1925 |
| 1,556,933 | Hem | Oct. 13, 1925 |
| 1,701,921 | Hamblin | Feb. 12, 1929 |
| 2,006,864 | Klosterman | July 2, 1935 |
| 2,465,330 | Patterson | Mar. 22, 1949 |

FOREIGN PATENTS

| Number | Country | Date |
|---|---|---|
| 26,987 | Norway | Jan. 5, 1916 |